(12) United States Patent
Garrison

(10) Patent No.: US 7,872,590 B2
(45) Date of Patent: Jan. 18, 2011

(54) REMOTE CONTROL HAVING EXTENDED FUNCTIONALITY

(75) Inventor: William J. Garrison, Warminster, PA (US)

(73) Assignee: General Instrument Corporation, Horsham, PA (US)

( * ) Notice: Subject to any disclaimer, the term of this patent is extended or adjusted under 35 U.S.C. 154(b) by 1090 days.

(21) Appl. No.: 11/056,768

(22) Filed: Feb. 11, 2005

(65) Prior Publication Data

US 2006/0181429 A1    Aug. 17, 2006

(51) Int. Cl.
*H04Q 9/00*    (2006.01)
(52) U.S. Cl. ............... 340/825.22; 340/825.69
(58) Field of Classification Search ......... 340/825, 340/825.69, 825.72, 825.63, 825.24, 825.25, 340/825.22; 341/176
See application file for complete search history.

(56) References Cited

U.S. PATENT DOCUMENTS

| | | | | |
|---|---|---|---|---|
| 4,663,626 A | * | 5/1987 | Smith | 340/825.69 |
| 5,469,152 A | * | 11/1995 | Yamamoto et al. | 340/825.63 |
| 6,208,271 B1 | * | 3/2001 | Armstrong | 341/34 |
| 2001/0005905 A1 | * | 6/2001 | Saib et al. | 725/57 |
| 2002/0122079 A1 | * | 9/2002 | Kamen et al. | 345/863 |

\* cited by examiner

*Primary Examiner*—Brian A Zimmerman
*Assistant Examiner*—Nabil H Syed
(74) *Attorney, Agent, or Firm*—Stewart M. Wiener

(57) ABSTRACT

A system and method for providing expanded functionality from a remote control handset, wherein multiple command functions are effected by the actuation of a single key or control surface. A remote control handset is programmed to recognize the actuation of keys or control surfaces associated with multiple-functionality. In response to a standard actuation (such as the momentary depression of that key) of a multiple-functionality key, a primary remote control signal is generated by the remote control handset for purposes of controlling a first remote system or component. The remote control handset is further adapted to test for and recognize a non-standard actuation (such as double-clicking or prolonged depression) of a multiple-functionality key, and responsively generate a second remote control signal. This second remote control signal can be generated for purposes of providing and alternate command to same system or component that is controlled by the primary remote control signal associated with the actuated key, or to an completely separate system or component.

18 Claims, 4 Drawing Sheets

REMOTE CONTROL HAVING EXTENDED FUNCTIONALITY

FIELD OF THE INVENTION

This invention relates to the field of remote control systems, and in particular to remote control systems for controlling the operation of a electronic devices such as television receivers, television set-top boxes ("STBs"), personal video recorders ("PVRs"), audio components, or residential home/environment systems.

BACKGROUND OF THE INVENTION

Remote control systems for consumer electronic devices such as television receivers and STBs typically comprise a battery-powered, handset transmitter having a keypad which transmits selected instructions in the form of an encoded infrared signal. The receiving device receives and decodes the signal and implements the instruction to, e.g., increase volume or change channel. Although convenient and easy to use, a remote control could prove deficient in the event that the device being controlled is provided with new features or functions. For example, in an exemplary configuration, a particular remote control handset may be used to control the functions of an STB which receives cable television programming and distributes such programming to a television receiver. A user may at a later date install a recording device, for example a hard disk based recording device ("HD recorder") such as a PVR, up-stream of the STB for recording preselected television programming. However, the original "legacy" remote control handset does not have any functionality for controlling the HD recorder, necessitating use of a separate remote control handset dedicated to HD recorder control, or new multi-function remote control. While a multi-function remote control handset can offer a user some utility, typically such controls suffer from one or more of the following drawbacks: i) a lack full functionality for the consumer electronics being controlled; ii) a keypad having a confusingly large number of individual keys to allow for increased functionality, and/or iii) or a requirement that the user hit multiple keys to effect a single function (i.e., hitting a "SHIFT" key to change the standard function of a given key).

It would be advantageous, therefore, to provide an adaptable remote control handset system for controlling devices added to legacy systems, and reduce or eliminate the typical drawbacks associated with multi-function remote control handsets. Furthermore, it would also be desirable to expand the capabilities of a remote control handset having a limited number of keypads with respect to the control of legacy system components.

SUMMARY OF THE INVENTION

The aforementioned limitations and drawbacks of previous remote control systems are overcome in accordance with the principles of this invention by an improved system and method for providing expanded functionality from a remote control handset adapted for the control of audio, video, or residential home/environmental systems wherein multiple command functions are effected by the actuation of a single key or control surface. The invention provides a system and method wherein a remote control handset is programmed to recognize the actuation of keys or control surfaces associated with multiple-functionality. In response to a standard actuation (such as the momentary depression of that key) of a multiple-functionality key, a primary remote control signal is generated by the remote control handset for purposes of controlling a first remote system or component. The remote control handset is further adapted to test for and recognize a non-standard actuation (such as double-clicking or prolonged depression) of a multiple-functionality key, and responsively generate a second remote control signal. This second remote control signal can be generated for purposes of providing and alternate command to same system or component that is controlled by the primary remote control signal associated with the actuated key, or to command a completely separate system or component. Other aspects of the invention enable the remote control to provide a user with affirmative feedback that a non-standard actuation has been recognized and an alternate key function executed.

BRIEF DESCRIPTION OF THE DRAWINGS

For a complete understanding of the present invention and the advantages thereof, reference is now made to the following description taken in conjunction with the accompanying drawings, wherein.

DESCRIPTION OF PREFERRED EMBODIMENTS

Figure 1:
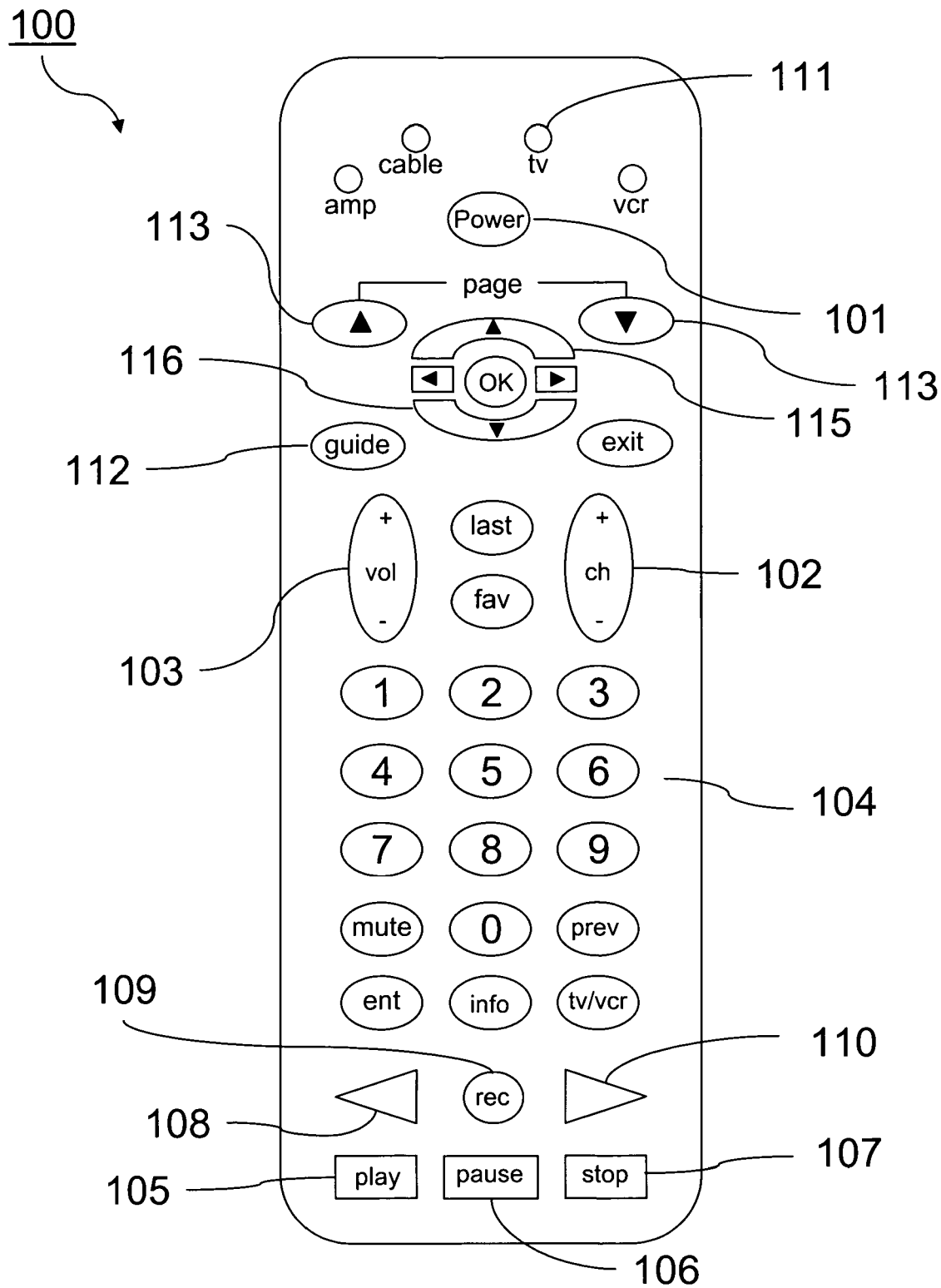
FIG. 1 is a front view of an exemplary remote control handset which may be used in accordance with the invention.

Referring to FIG. 1, in a first exemplary embodiment the system includes remote control handset 100, which represents a typical remote control handset used for controlling the functions of a cable STB. For example remote control handset 100 includes power on/off button 101, channel up/down button 102 and volume up/down buttons 103. Remote control handset 100 also has a numeric keypad 104 for direct entry of desired entry and access of a desired channel.

As is known in the art, remote control handset 100 can be programmed with predefined manufacturer codes to enable control of, e.g., any number of models of VCR or television from any of a number of manufacturers. Once programmed with specific VCR control codes, buttons 105-110 can be used to control typical VCR functions such as stop (105), play (107) and record (109). Once programmed with specific television control codes, remote control handset 100 can be used to control a television using substantially the same buttons as are used to control a STB. For example, by pressing TV button 111, TV control functionality is imparted to remote 100. Volume button 103 and channel change buttons 102 can be used to provide volume adjustments and change channels of a television receiver. Numerical keypad also can be used in this mode to directly change channels of the television receiver.

Figure 2:
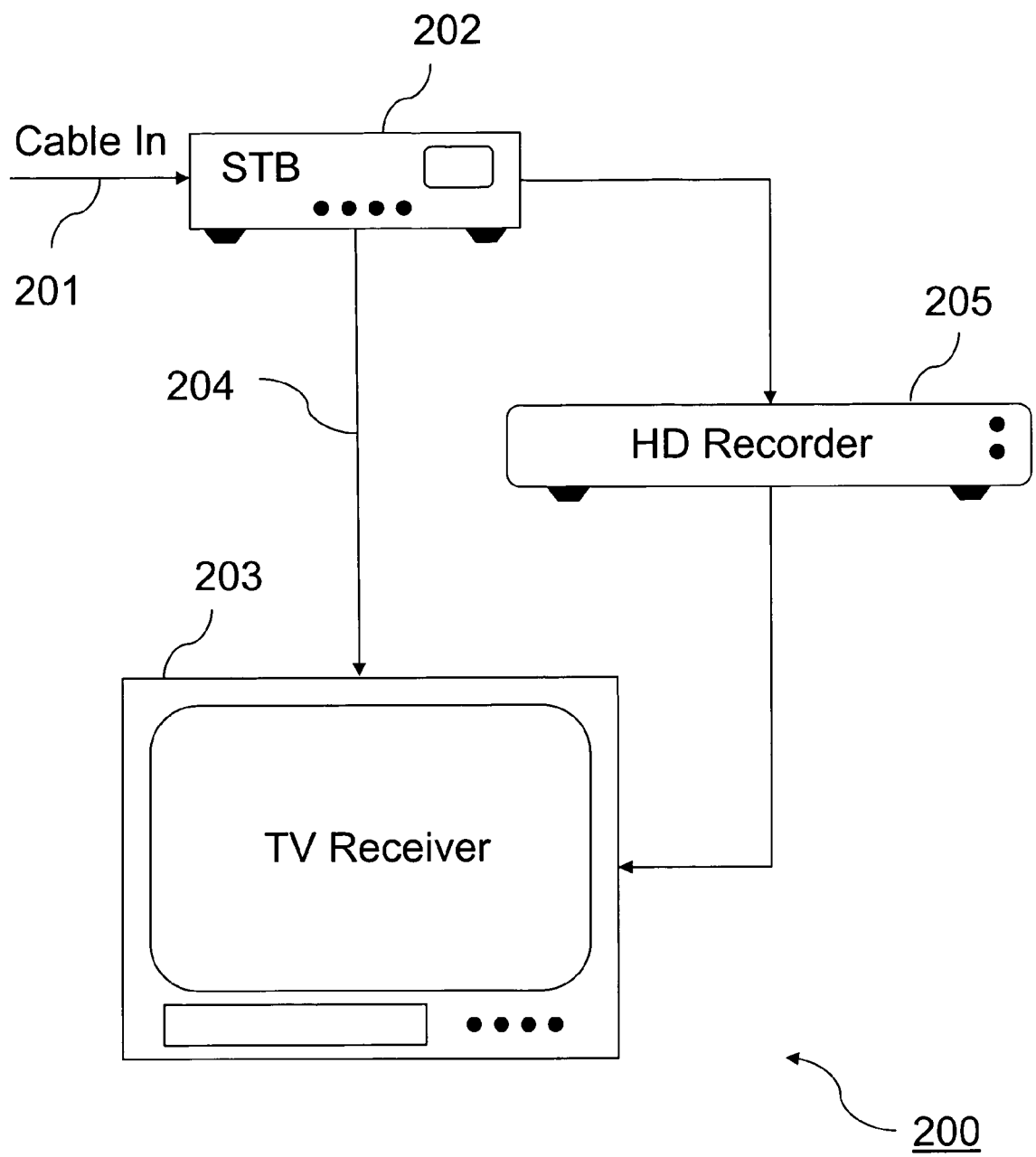
FIG. 2 is a block diagram of an exemplary video monitoring system useful with which the invention may be used.

FIG. 2 depicts a typical home television arrangement 200. A cable TV source 201 is coupled to an input of STB 202. In a conventional setting, as illustrated by connector 204, STB 202 selectively delivers directly to TV receiver 203 one of a number of possible television channels delivered by cable 201.

Hard disk recorders (HD recorders) are becoming increasingly popular as a means for recording and storing television programming. As shown in FIG. 2, a typical arrangement employing a HD recorder in a video system includes HD recorder 205, coupled between STB 202 and television receiver 203. Television signals provided by cable 201, are received by STB 202 and tuned so that a single program is viewed. However, since HD recorders are relatively new components in the video consumer electronics field, legacy remote control handsets are not equipped with the functionality to control such components. Manufacturers or cable service providers could make new remote control handsets available in addition to or as replacements for the legacy remote control handsets that include functionality for controlling new components such as a HD recorder, but this is an expensive and logistically difficult solution. Instead, it would be advantageous to be able to continue to use a legacy remote control handset to control the new component.

Figure 3:
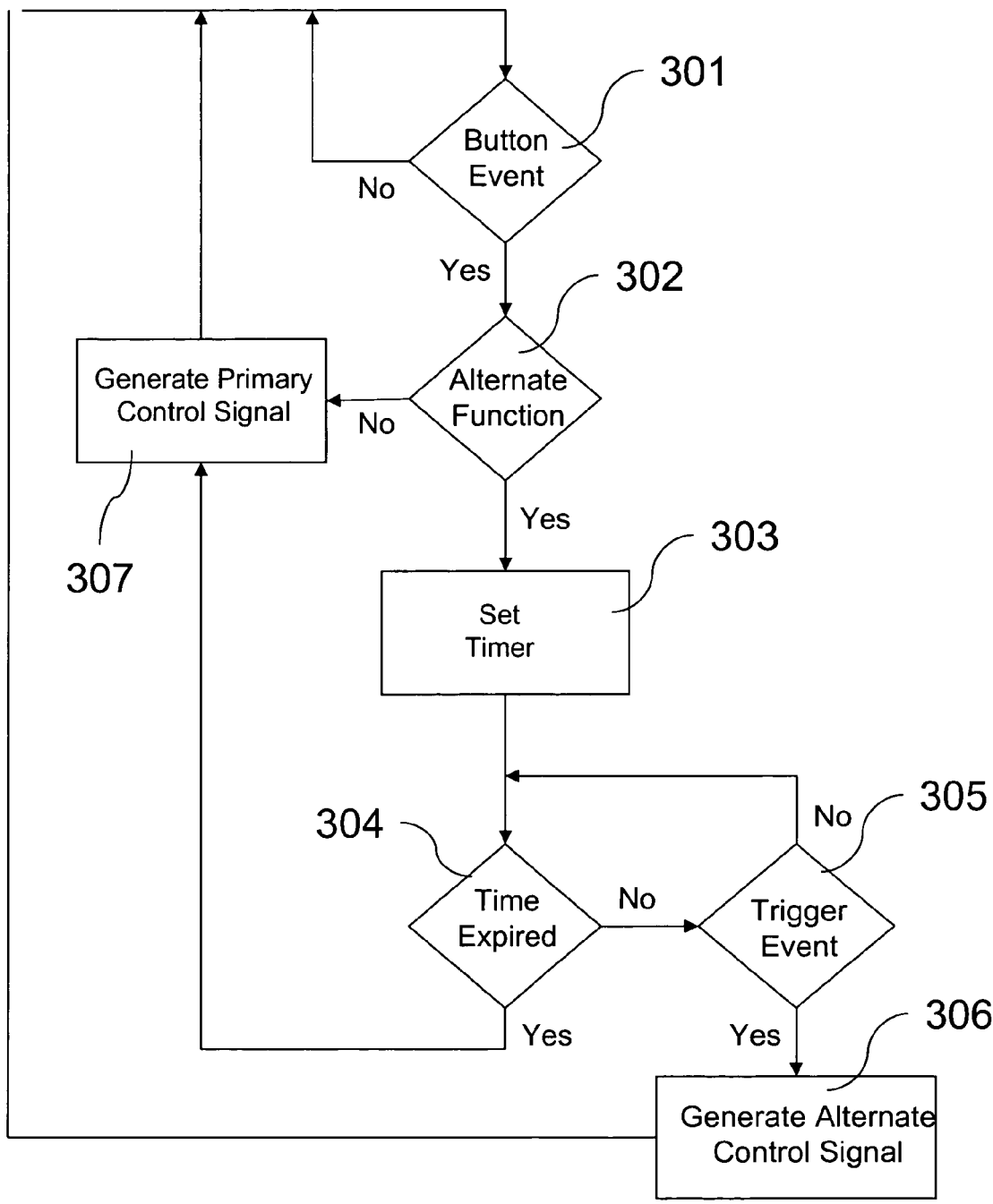
FIG. 3 is a flow chart of an exemplary embodiment of the invention.

In an embodiment of the invention, a remote control handset, 100, is provided with double click functionality; a single click of a button on remote control handset 100 effects control of a first device (for example STB 202), and a second click within a prescribed time period effects control of a second device (for example, HD recorder 205). In the embodiment shown in FIGS. 1 and 3, logic circuitry within remote control handset 100 recognizes a button event 301, such as the depression of a button, such as "guide" button 112. The logic circuit analyses 302 the button event to determine if the code is consistent with a button which has been provided with dual or alternate functionality. In the event the analysis shows that the code is from a button not intended to have dual or alternate functionality, the remote control handset 100 performs the instructions consistent with the button and generates a primary control signal (307). However, if the button is recognized as one which is associated with a multiple or alternate functionality, a timer, preferably a software timer, is set 303 within remote control handset 100. The timer begins counting down a predetermined, but user selectable, time period 304. The selection of this time period can be made by the user through the keypad 104, or by interfacing remote control handset 100 with a personal computer or other control means, as is well known in the art. This time period can be of any duration, but for practicality preferably is between 0.5 and 5 seconds. In the event the same button, for example in this case "guide" button 112 on remote control handset 100 is not depressed before expiration of the set time period, a primary control signal is generated by remote control handset 100, and STB 202 is commanded to display a program guide However, in the event button 112 on remote control handset 100 is depressed a second time before expiration of the prescribed time period (Trigger Event 305), remote control handset 100 generates alternate control signal (306). In an a particular embodiment of the invention, the alternate control signal could be, for example, directed to controlling HD recorder 205 and command the display of an index of the programming stored therein.

In further exemplary embodiments, additional buttons on remote control handset 100 have dual functionality. By way of example, page up and page down buttons 113 and 114, respectively, could, if depressed twice before the expiration of the allotted time 303, be used to page up or down through the HD recorder contents index. Similarly, channel selector 102 or numbered buttons 104 could have dual functionality to select a program stored on HD recorder 205 for playback. It should be understood that the choice of buttons described herein as having dual functionality and the functions described are for explanatory purposes only. For example, it is within the scope of this invention that up and own arrows 115 and 116 are provided with the dual functionality such as to scroll through the HD recorder index.

In an alternate preferred embodiment of the invention a prolonged depression of a button on the remote, as opposed to a double-clicking, serves as the trigger for execution of an alternate function. As with the previously described embodiment, the logic circuitry within remote control handset 100 recognizes a button event, such as the depression of "guide" button 112. The remote control handset logic circuitry analyzes (302) the button event to determine if the code is consistent with a button which has been provided with dual or alternate functionality. In the event the analysis shows that the code is from a button not intended to have dual or alternate functionality, the remote control handset 100 performs the instructions consistent with the button and generates a primary control signal (307). However, if the button is recognized as one which is associated with a multiple or alternate functionality, a timer is set 303 within remote control handset 100. The timer begins counting down a predetermined, but user selectable, time period 304 (as with the previously described embodiment, the selection of this time period can be made by the user). This time period can be of any duration, but for practicality preferably is between 1 and 3 seconds. In the event the same button, for example in this case "guide" button 112 on remote controller 100 has been released prior to the expiration of the set time period, a primary control signal is generated by remote control handset 100, and STB 202 is commanded to display a program guide. However, in the event button 112 on remote control handset 100 remains depressed throughout the duration of the prescribed time period a trigger event is recognized (305), and remote control handset 100 generates an alternate control signal (306). In an a particular embodiment of the invention, the alternate control signal could be, for example, directed to controlling HD recorder 205 and command the display of an index of the programming stored therein.

The invention has been described above as a remote control handset having dual functionality to accommodate an addition of an up stream box, such as a HD recorder for a television viewing system. However, the invention is useful for purposes other than control of a newly added component. For example, the invention is useful in enabling compact remote controllers having a limited number of control buttons to control more than one component and wherein the processing concerning which component to control is made in the remote.

Figure 4:
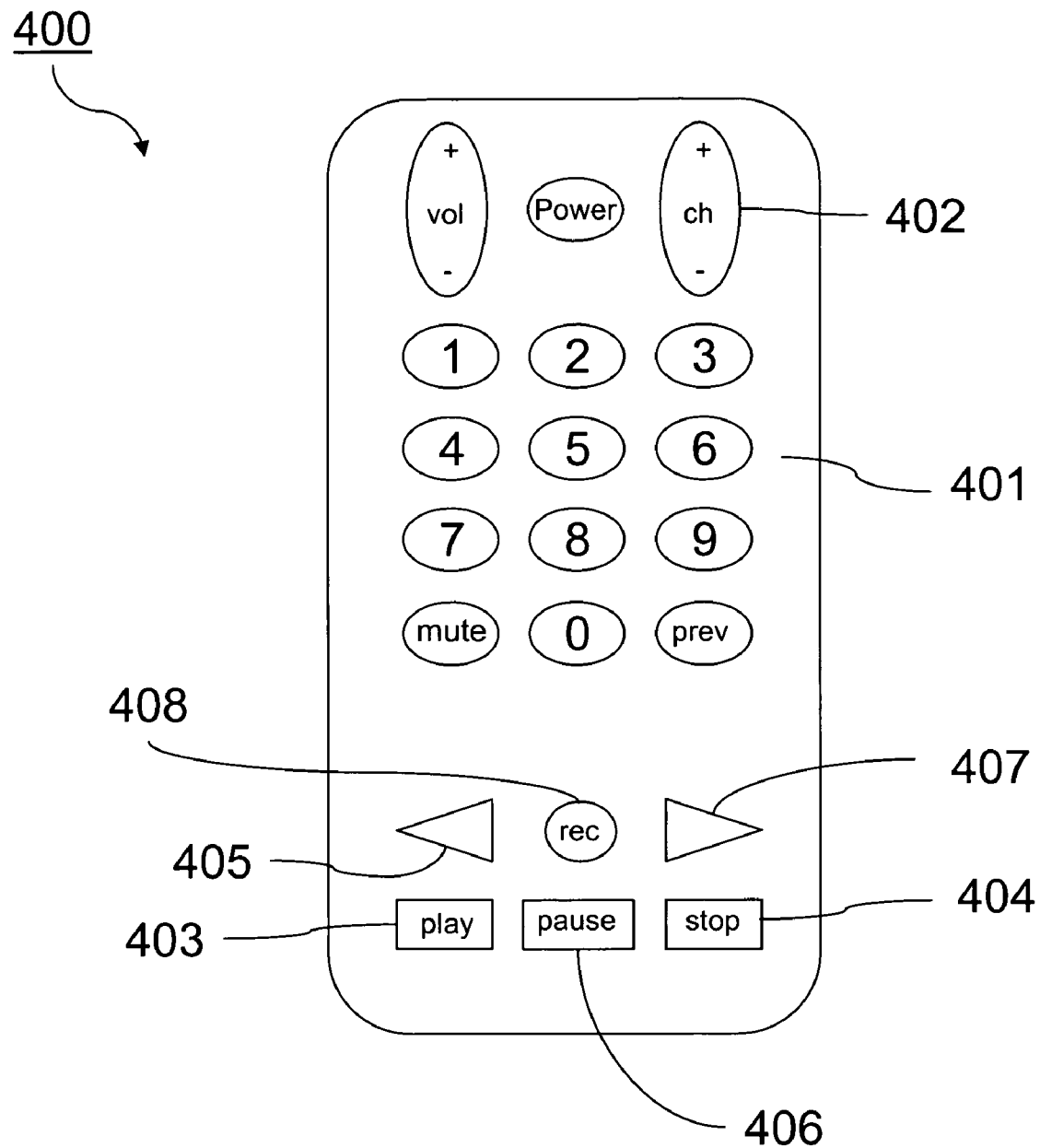
FIG. 4 is a front view of an exemplary compact remote control handset.

Refer, for example to FIG. 4. Compact remote control handset 400 has a limited number of control buttons, whereby it would be necessary to assign dual functions to certain of the buttons in order to provide a reasonable degree of control of multiple components. For example, compact remote control handset 400 can be used to select channels on both a television receiver and a set-top box using numbered keypad 401 and or channel change rocker switch 402. As described above and as illustrated in FIG. 4, a user desiring to tune to channel 3 on the television receiver would push button 3 on keypad 401 or step through the channels until arriving at channel 3 using button 402. In the case where a user pushes button 3 on keypad 401, logic in remote controller 400 identifies the button event in step 301. Since button 3 has been given alternate functionality, decision step 302 is affirmatively answered and results in the setting of an internal timer 303 in compact remote control handset 400. The clock interval can be factory programmed or is user selectable and typically set to be between to 0.5 to 5 seconds. If the time expires, and there has not been a second button event then, as indicated in decision step 304, the button message is sent. In the embodiment under discussion, this could be a code understood by television receiver 203 to tune to channel 3. If before expiration of the timer 304, button 3 is depressed a second time a trigger event is recognized (305), and an alternate button message is sent by compact remote control handset 400. This alternate button message could be, for example, a code understood by set-top box to tune to channel 3.

In a like manner, compact remote control handset 400 can be used to control both a DVD player and a VCR. For example, a single push on button 403, which is not repeated within the time increment set (step 304), results in, for example, a play operation of a DVD player (not shown). If, however, a user depresses button 403 twice within the time increment a trigger event is recognized (305), and a different code is emitted by compact remote control handset 400 sending a "play" command to a VCR (not shown). Similar multi-function operation of individual buttons of compact remote control handset 400 advantageously can be used to control other functions similar in nature on both, e.g., a DVD player and a VCR. For example, buttons 404, 405, 406, 407 and 408 can be used to control, respectively, the stop, rewind, pause, fast forward and record functions on both a DVD recorder and a VCR, depending on whether a user depresses any on of them once or twice within a set time period.

The operation of compact remote control handset 400 could also be adapted so that a prolonged depression of a button on the remote, as opposed to a double-clicking, would serves as the trigger for execution of an alternate function. As with the previously described embodiment, a user pushes button 3 desiring to tune to channel 3 on the television receiver, and logic in compact remote control handset 400 identifies the button event in step 301. Since button 3 has been given alternate functionality, decision step 302 is affirmatively answered and results in the setting of an internal timer 303 in compact remote control handset 400. The clock increment can be factory programmed or is user selectable and typically set to be between to 1 and 3 seconds. If button 3 has been released by the expiration of the clock increment, as indicated in decision step 304, the standard button message is sent. In the embodiment under discussion, this could be a code understood by television receiver 203 to tune to channel 3. However, if at the expiration of the timer 304, button 3 remains depressed a trigger event is recognized (305), and an alternate button message is sent by compact remote control handset 400. This alternate button message could be, for example, a code understood by set top box to tune to channel 3.

In any of the above embodiments, the remote control handsets (100, 400) could be configured to provide the user with affirmative feedback that a trigger event had been recognized and an alternate key function executed. This feedback could be an audio tone or vibration emitted by the remote control, or a change in illumination of the particular depressed key or the entire keypad. Methods of providing such audio/tactile/visual feedback within handheld remote control systems are well known in the art.

The disclosed system and method may be implemented within many environments utilizing remote control systems, independent of the particular type signalling employed by the remote control handset (IR, radio frequency, ultrasonics, etc.), the types of systems being controlled (audio/visual, video, residential home/environment, robotic, etc.), or the particular key actuation(s) that are recognized as trigger events for secondary or alternate key functionality (double click, triple click, prolonged depression, etc.)

Although the invention has been described herein by reference to exemplary embodiments thereof, it will be understood that such embodiment is susceptible of modification and variation without departing from the inventive concepts disclosed. All such modifications and variations, therefore, are intended to be encompassed within the spirit and scope of the appended claims.

I claim:

1. A remote control system generating control signals for reception by at least one responsive device, said system comprising:
   an actuator for initiating the generation of remote control command signals;
   logic means responsive to said actuator and adapted to determine if an alternate remote control functionality is associated with said actuator;
   a fixed interval timer initiated by said logic means determination that an alternate remote control functionality is associated with said actuator;
   a trigger event sensor adapted to detect if a preset actuator condition has been fulfilled by the termination of said fixed interval wherein said preset actuator condition is a completion of more than one cycling of said actuator prior to the termination of said fixed interval;
   control signal generation means adapted to generate a primary remote control signal in response to a determination by said logic means that an alternate remote control functionality is not associated with said actuator or a determination by said trigger event sensor that said preset actuator condition has not been fulfilled by the termination of said fixed interval, and further adapted to generate an alternate remote control signal in response to said actuator and a determination by said trigger event sensor that said preset actuator condition has been fulfilled by the termination of said fixed interval.

2. The remote control system of claim 1, wherein the duration of said fixed interval is selected by the user of the remote control system.

3. The remote control system of claim 1, wherein said fixed interval is between 0.5 and 5 seconds.

4. The remote control system of claim 1, wherein said primary remote control signal and said alternate remote control signal are both generated for reception by, and control of, the same responsive device.

5. The remote control system of claim 1, wherein said primary remote control signal is generated for reception by, and control of, a first responsive device, and said alternate remote control signal is generated for reception by, and control of, a second responsive device.

6. The remote control system of claim 1, further comprising a feedback means adapted to provide an indication to a user confirming a determination by said trigger event sensor that a preset actuator condition has been fulfilled by the termination of the interval measured by said fixed duration timer.

7. The remote control system of claim 6, wherein said indication comprises an audible signal.

8. The remote control system of claim 6, wherein said indication comprises an optical signal.

9. The remote control system of claim 6, wherein said indication comprises a tactile signal.

10. A method for the generation of remote control signals for reception by at least one responsive device, comprising:
    detecting the actuation of a user operated control;
    determining if said user operated control is associated with an alternate remote control functionality;
    generating a primary remote control signal in response to said control operation and a determination that an alternate remote control functionality is not associated with said user operated control;

initiating the measurement of a fixed interval in response to said actuation of a user operated control and a determination that an alternate remote control functionality is associated with said user operated control;

determining if a predefined user operated control condition has been fulfilled by the termination of said fixed duration wherein the predefined user operated control condition is the completion of more than one cycling of said user operated control prior to the termination of said fixed interval;

generating an alternate remote control signal in response to said actuation of said user operated control and said determination that a predefined user operated control condition has been fulfilled by the termination of said fixed interval.

11. The method of claim 10, further comprising specifying the duration of said fixed interval by the actuation of one or more user operated controls.

12. The method of claim 10, wherein said fixed interval is between 0.5 and 5 seconds.

13. The method of claim 10, wherein said primary remote control signal and said alternate remote control signal are both generated for reception by, and control of, the same responsive device.

14. The method of claim 10, wherein said primary remote control signal is generated for reception by and control of a first responsive device, and said alternate remote control signal is generated for reception by and control of a second responsive device.

15. The method of claim 10, further comprising generation of a feedback signal adapted to provide an indication to a user confirming that a predefined user operated control condition has been fulfilled by the termination of said fixed duration.

16. The method of claim 15, wherein said feedback signal comprises an audible signal.

17. The remote control system of claim 15, wherein said feedback signal comprises an optical signal.

18. The remote control system of claim 15, wherein said feedback signal comprises a tactile signal.

* * * * *